US008735520B2

(12) United States Patent
Uschold

(10) Patent No.: US 8,735,520 B2
(45) Date of Patent: May 27, 2014

(54) VINYL FLUORIDE POLYMERIZATION AND AQUEOUS DISPERSION OF VINYL FLUORIDE POLYMER

(75) Inventor: Ronald Earl Uschold, West Chester, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 35 days.

(21) Appl. No.: 13/276,512

(22) Filed: Oct. 19, 2011

(65) Prior Publication Data

US 2012/0116016 A1     May 10, 2012

Related U.S. Application Data

(60) Provisional application No. 61/411,630, filed on Nov. 9, 2010.

(51) Int. Cl.
*C08F 214/18*     (2006.01)
(52) U.S. Cl.
USPC .......................... 526/242; 526/249; 524/805
(58) Field of Classification Search
USPC .................................. 526/242, 249; 524/805
See application file for complete search history.

(56) References Cited

U.S. PATENT DOCUMENTS

| 2,419,008 A | 4/1947 | Coffman et al. |
| 2,419,010 A | 4/1947 | Coffman et al. |
| 2,510,783 A | 6/1950 | Johnston et al. |
| 2,599,300 A | 6/1952 | Upson |
| 3,801,550 A * | 4/1974 | Adelman et al. ............. 428/520 |
| 5,229,480 A | 7/1993 | Uschold |
| 6,242,547 B1 | 6/2001 | Uschold |
| 6,248,494 B1 * | 6/2001 | Yamazaki et al. ......... 430/110.3 |
| 6,403,740 B1 | 6/2002 | Uschold |
| 6,759,131 B2 * | 7/2004 | McCarthy ..................... 428/421 |
| 6,806,333 B2 | 10/2004 | Ishida et al. |
| 6,846,518 B2 * | 1/2005 | Katoh et al. .................. 427/337 |

(Continued)

FOREIGN PATENT DOCUMENTS

| FR | 1410004 A | | 9/1965 |
| FR | 1422651 A | | 12/1965 |
| GB | 1069364 | * | 5/1967 |
| GB | 1069364 A | | 5/1967 |
| GB | 1073392 | * | 6/1967 |
| GB | 1073392 A | | 6/1967 |

OTHER PUBLICATIONS

International Search Report dated Jun. 4, 2012, International Application No. PCT/US2011/057070.
Blackley, D. C., Emulsion Polymerisation Theory and Practice, 1975, pp. 308-318, Halsted Press, John Wiley & Sons, New York.
U.S. Appl. No. 13/292,344, filed Nov. 9, 2011.
U.S. Appl. No. 13/292,373, filed Nov. 9, 2011.
U.S. Appl. No. 13/292,356, filed Nov. 9, 2011.

*Primary Examiner* — Peter D. Mucahy
*Assistant Examiner* — Henry Hu

(57) ABSTRACT

A process for producing vinyl fluoride polymer comprising polymerizing vinyl fluoride in an aqueous polymerization medium containing initiator and halogen-free surfactant with a critical micelle concentration of less than about 0.05 weight percent at 25° C. The halogen-free surfactant is present in the aqueous polymerization medium in an amount less than about 0.1 weight percent based on the weight of the aqueous polymerization medium. The aqueous polymerization medium is essentially free of halogen-containing surfactant. An aqueous dispersion comprising vinyl fluoride polymer particles present in a range of from about 5 to about 40 weight percent based on the weight of the aqueous phase, wherein said vinyl fluoride polymer particles have a $D_v(50)$ of less than about 20 microns, and halogen-free surfactant, wherein said halogen-free surfactant is present in said aqueous dispersion in an amount less than 0.1 weight percent based on the weight of the aqueous phase.

18 Claims, 3 Drawing Sheets

(56) References Cited

U.S. PATENT DOCUMENTS

| | | |
|---|---|---|
| 7,396,627 B2 * | 7/2008 | Watanabe et al. .......... 430/109.3 |
| 7,728,087 B2 | 6/2010 | Hintzer et al. |
| 8,080,621 B2 | 12/2011 | Amin-Sanayei et al. |
| 8,158,734 B2 | 4/2012 | Amin-Sanayei et al. |
| 8,338,518 B2 | 12/2012 | Amin-Sanayei et al. |
| 2006/0281845 A1 | 12/2006 | Amin-Sanayei et al. |
| 2012/0142858 A1 | 6/2012 | Amin-Sanayei et al. |
| 2013/0079461 A1 | 3/2013 | Amin-Sanayei et al. |

* cited by examiner

VINYL FLUORIDE POLYMERIZATION AND AQUEOUS DISPERSION OF VINYL FLUORIDE POLYMER

FIELD OF THE INVENTION

The present invention relates to the polymerization of vinyl fluoride in an aqueous polymerization medium and an aqueous dispersion of vinyl fluoride polymer.

BACKGROUND OF THE INVENTION

Poly(vinyl fluoride) (PVF) is used in film form for a variety of protective and decorative applications. Because of its proven weatherability and moisture barrier properties, poly (vinyl fluoride) is particularly desirable for use as a protective layer in backsheets for photovoltaic modules.

The polymerization of vinyl fluoride (VF) to produce PVF has typically been carried out in water as the polymerization medium and by employing a water soluble organic azo-type initiator such as 2,2'-azobis(2-amidinopropane)dihydrochloride and 2,2'-azobis(N,N'-dimethyleneisobutyroamidine)dihydrochloride to yield a highly fluid aqueous dispersion or slurry of very finely divided polymer particles. Polymerizations of this type, in which the initiator is water soluble and the monomer has limited water solubility, are often termed emulsion polymerizations.

PVF has been produced in emulsion polymerization processes which do not employ surfactants. In processes of this type, significant limitations and problems have been encountered. In batch processes which produce an aqueous PVF dispersion, the PVF solids content has typically been limited to about 15 weight percent or less. If it is attempted to increase the solids content, coagulum (undispersed polymer which must be discarded as waste) results and/or undesirable particle aggregates form which can cause defects in film made from the dispersion. In continuous processes which produce a slurry of aggregates of primary PVF particles, a significant problem encountered is the broad particle size distribution of the polymer particles formed. It is desirable for the PVF to be produced as a slurry of aggregates of primary particles with the aggregates being in the size range of 6-11 μm which enables the PVF to be separated from the aqueous medium by filtration. However, in a continuous PVF polymerization process, a significant amount of larger particle aggregates are formed, some of which can be as large as 400 μm. Larger particles, such as those above 30 μm, produce defects in polyvinyl fluoride film formed from the PVF polymer resin and cause reactor scaling, requiring periodic shutdowns for reactor cleaning. To attempt to control particle size, the typical approach has been to limit the PVF solids content produced by the process. This necessarily limits the capacity of the reactor and has been found to be only partially successful in preventing the formation of large particles.

It is known in the art of emulsion polymerization that the addition of surfactants aids in stabilization of the polymer particles formed and can improve polymerization processes. For fluoropolymers which contain tetrafluoroethylene and/or other perfluorinated monomers, anionic fluorosurfactants such as ammonium perfluorooctanoate (APFO) have typically been used since they are generally non-telogenic and do not inhibit the polymerization reaction. For polyvinyl fluoride) polymerizations employing cationic organic azo-type initiators, an anionic fluorosurfactant cannot be used because it will form an insoluble complex salt with the initiator. U.S. Pat. No. 5,229,480 to Uschold discloses, for use in the polymerization of vinyl fluoride, a cationic fluorosurfactant of the formula $F(CF_2CF_2)_nRNH_3X$ where R is selected from at least one of $CH_2CH_2CH_2$ and $CH_3CCH_3$, n is an integer from 3-5, and X is an anion free from hydrogen atoms susceptible to attack by initiator or polymer radicals. However, because of environmental concerns which have been raised concerning APFO and because fluorosurfactants are expensive, a polymerization process employing a halogen-free surfactant would be desirable.

A variety of halogen-free nonionic and cationic surfactants are commercially available and are known to be useful in emulsion polymerization of hydrocarbon polymers, e.g., polystyrene, styrene-butadiene copolymers, polyvinyl acetate, etc. Examples of many such materials are described in D. C. Blackley, "Emulsion Polymerization", Halsted Press, New York, N.Y., 1975, pp 308-318. The nonionic surfactants described by Blackley contain hydrophilic segments derived from oligomers of ethylene oxide. While these surfactants are compatible with the organic azo-type initiators, when used in the polymerization of vinyl fluoride in the amounts typically used in hydrocarbon polymer polymerizations, they produce low yields of low molecular weight PVF products that are not useful in typical applications for PVF. Common cationic surfactants such as dodecylammonium chloride, cetyltrimethylammonium bromide or cetylpyridinium bromide are stated by Blackley as being useful in hydrocarbon polymer polymerizations. While these surfactants are also compatible with organic azo-type initiators, U.S. Pat. No. 5,229,480 to Uschold shows that the use of surfactants of this type produce PVF of low molecular weight in reduced yields and often contribute a highly undesirable yellow color to the polymer.

SUMMARY OF THE INVENTION

The present invention is based on the discovery that halogen-free surfactants with a very low critical micelle concentration, employed in low amount in an aqueous medium during the polymerization of vinyl fluoride, can increase the solids level and/or control the particle size distribution of the vinyl fluoride polymer produced without significant adverse effect on the vinyl fluoride polymer molecular weight.

The process of the invention relates to producing vinyl fluoride polymer by polymerizing vinyl fluoride in an aqueous polymerization medium containing initiator and halogen-free surfactant with a critical micelle concentration of less than about 0.05 weight percent at 25° C. The halogen-free surfactant is present in the aqueous polymerization medium in an amount less than about 0.1 weight percent based on the weight of the aqueous polymerization medium. The aqueous polymerization medium is essentially free of halogen-containing surfactant.

Preferably, the halogen-free surfactant is present in the aqueous polymerization medium in an amount above the critical micelle concentration for the surfactant.

An aqueous dispersion comprising vinyl fluoride polymer particles present in a range of from about 5 to about 40 weight percent based on the weight of the aqueous phase, wherein said vinyl fluoride polymer particles have a $D_v(50)$ of less than about 20 microns, and halogen-free surfactant, wherein said halogen-free surfactant is present in said aqueous dispersion in an amount less than 0.1 weight percent based on the weight of the aqueous phase.

DETAILED DESCRIPTION OF THE INVENTION

Vinyl Fluoride Polymer

Figure 1:
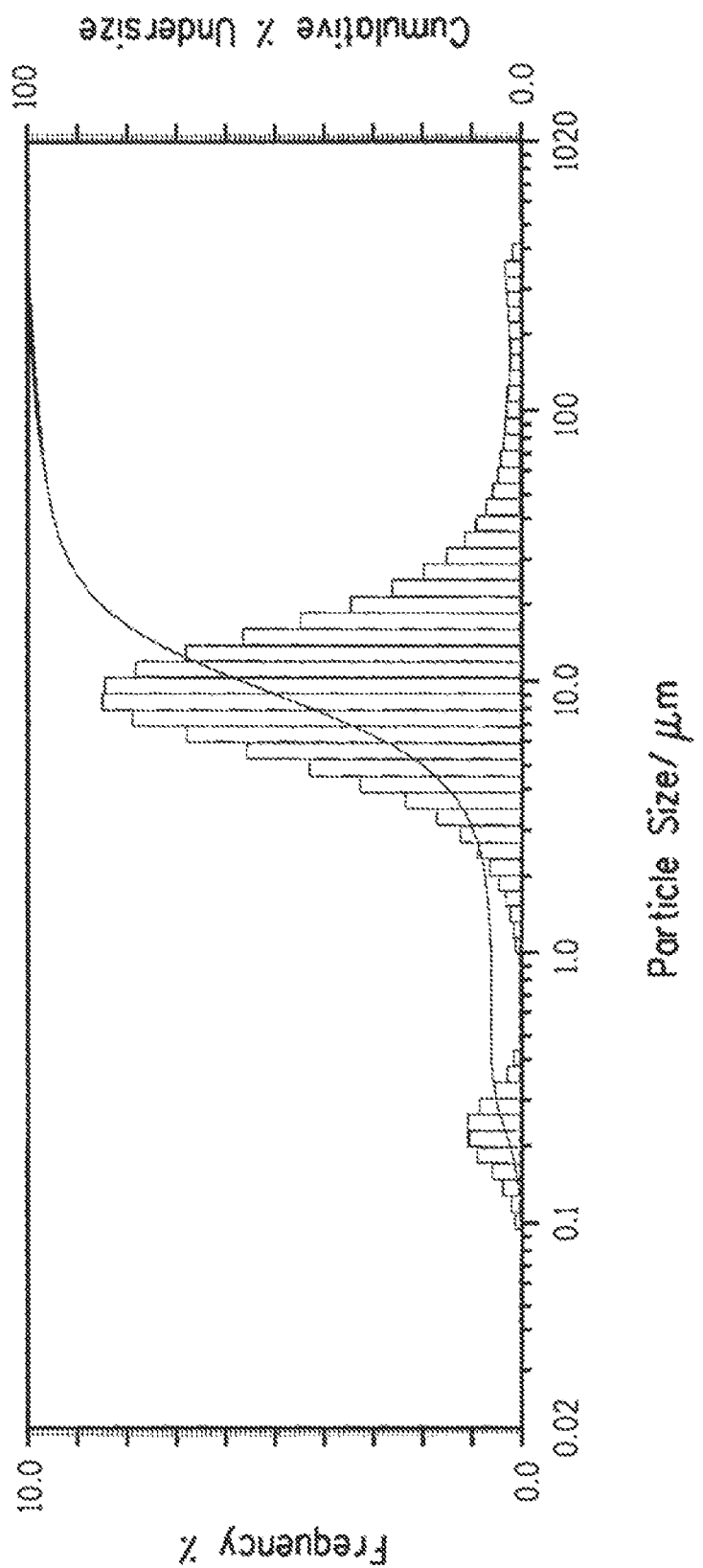
FIG. 1 is a graphical representation of the particle size distribution of particles of poly(vinyl fluoride) produced in a continuous process without the use of surfactant (Comparative Example 3).

"Vinyl fluoride polymer" as used in this application means vinyl fluoride homopolymer and copolymers containing vinyl fluoride as a monomer. In vinyl fluoride copolymers, comonomers may include any of a wide variety of fluorinated and nonfluorinated monomers which copolymerize with vinyl fluoride. Preferred fluorinated monomers include fluoroolefins, fluorinated vinyl ethers, and fluorinated dioxoles. Examples of fluoroolefins are tetrafluoroethylene (TFE), hexafluoropropylene (HFP), chlorotrifluoroethylene (CTFE), vinylidene fluoride, trifluoroethylene, hexafluoroisobutylene, and perfluorobutyl ethylene. Examples of fluorinated vinyl ethers are perfluoro(propyl vinyl ether), perfluoro(ethyl vinyl ether), and perfluoro(methyl vinyl ether). Examples of fluorinated dioxoles are perfluoro-2,2-dimethyl-1,3-dioxole (PDD) and perfluoro-2-methylene-4-methyl-1,3-dioxolane (PMD). Monomers which introduce functionality into the vinyl fluoride polymer may also be employed such as fluorinated vinyl ethers with functional groups such as sulfonyl fluoride (hydrolyzable to sulfonic acid), carboxylic acid ester (hydrolyzable to carboxylic acid and reducible to alcohol), nitrile, cyanate, carbamate, and phosphonic acid.

Preferably, the vinyl fluoride polymer comprises at least about 90 weight percent vinyl fluoride monomer units. In one preferred embodiment, the vinyl fluoride polymer comprises vinyl fluoride homopolymer.

Halogen-Free Surfactant

The surfactant used in the polymerization process of this invention is a halogen-free surfactant with a critical micelle concentration (CMC) of less than about 0.05 weight percent at 25° C.

By "Halogen-free surfactant" is meant surfactant that is free of halogen covalently bonded to carbon in the surfactant molecule. Halogen may be present as the counter ion in surfactant which has, for example, cationic groups. Classes of surfactants which fall within the term "halogen-free surfactant" include, but are not limited to, siloxane surfactants and hydrocarbon surfactants which are described in more detail hereinafter.

"Critical micelle concentration" (CMC) as used in this application refers to critical micelle concentration measured in water at 25° C. using the procedure stated in the Test Methods which follow. Preferably, the halogen-free surfactant has a CMC of less than about 0.01 weight percent at 25° C. The low CMC of the surfactants is believed to allow their use at low enough concentrations that competing reactions such as inhibition of polymerization or chain transfer do not cause significant adverse effect on the PVF polymer molecular weight. Thus, in a process of the invention, for a given percent solids, the particle size of primary particles formed is smaller in the presence of the halogen-free surfactant and can be controlled by the amount of halogen-free surfactant used, i.e., the primary particle size decreases as the amount of halogen-free surfactant increases in the aqueous medium. This is believed to occur because the number of micelles formed by the halogen-free surfactant increases with concentration, providing more nucleation sites for vinyl fluoride polymer particles. This increase in nucleation sites results in smaller particles that are colloidally more stable. As a result, higher solids dispersions can be prepared.

Preferred surfactants for use in the process of the invention have a hydrophilic lipophilic balance (HLB) of less than about 10, more preferably, less than about 7. A preferred HLB range is about 1 to about 7.

In a preferred form of the process of the invention, the halogen-free surfactant is nonionic. A nonionic surfactant does not contain a charged group but has a hydrophobic portion that may be, for example, a long chain hydrocarbon group or a segment formed by polymerization of propylene oxide. The hydrophilic portion of the nonionic surfactant typically is provided by a segment formed from polymerization of ethylene oxide.

The halogen-free surfactant employed preferably is hydrocarbon surfactant. By "hydrocarbon surfactant" is meant that 100% of the monovalent substituents bonded to carbon in the surfactant are hydrogen.

Preferably, the halogen-free surfactant is free of aromatic groups.

A preferred group of suitable nonionic surfactants are those having polymeric blocks of alkylene oxide units. Preferably, the nonionic surfactant comprises polymeric blocks of ethylene oxide and polymeric blocks of propylene oxide. Examples of suitable nonionic hydrocarbon surfactants of this type are difunctional block copolymers supplied as the Pluronic® series and the Pluronic® R series from BASF Corporation (Florham Park, N.J.). One example of the Pluronic® series is Pluronic® L92 with a polypropyleneoxide block between two polyethyleneoxide blocks. The Pluronic® R series has the reverse configuration with a polyethyleneoxide block sandwiched between two polypropyleneoxide blocks. An especially useful nonionic hydrocarbon surfactant of this type is Pluronic® 31R1 which is depicted below:

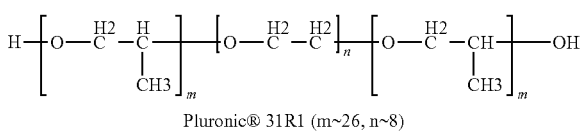

Pluronic® 31R1 (m~26, n~8)

Additional nonionic hydrocarbon surfactants of this type are sold under the trademark Tetronic® by BASF and are tetrafunctional block copolymers derived from the sequential addition of propylene oxide and ethylene oxide to ethylenediamine. Two suitable nonionic hydrocarbon surfactants of this type are Tetronic® 701 and Tetronic® 150R1 represented in the structure below, in which PEO and PPO represent polyethyleneoxide and polypropyleneoxide blocks, respectively:

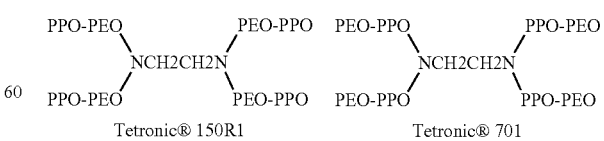

Tetronic® 150R1        Tetronic® 701

Another suitable group of nonionic hydrocarbon surfactants are branched aliphatic alcohol ethoxylates which have CMC values less than 0.05 weight percent. The Tergitol® 15-S series sold by The Dow Chemical Co. (Midland, Mich.)

includes surfactants of this type. A suitable example of such surfactants is Tergitol® 15-S-7.

Mixtures of the various suitable surfactants described above can be used in accordance with the present invention.

Initiators

The initiators used in the present invention are preferably water-soluble free-radical initiators. Preferred initiators produce cationic end groups in the polymer. One preferred class of initiators are water soluble organic azo initiators such as 2,2'-azobis(2-amidinopropane)dihydrochloride and 2,2'-azobis(N,N'-dimethyleneisobutyroamidine)dihydrochloride. 2,2'-azobis(2-amidinopropane)dihydrochloride is available as V-50 from Wako Chemical Co. (Richmond, Va.). 2,2'-azobis(N,N'-dimethyleneisobutyroamidine)dihydrochloride is available as VA-044 from Wako Chemical Co.

Process

The process can be carried out using the equipment and the general procedures known in the art for the aqueous emulsion polymerization of vinyl fluoride polymers using water soluble initiators, as are employed in the processes disclosed in, for example, in U.S. Pat. Nos. 2,419,008, 2,419,010, 2,510,783, 2,599,300, 5,229,480, 6,242,547 and 6,403,740. Polymerization temperatures typically employed for the polymerization of vinyl fluoride polymer can be used in the practice of the present invention. A suitable temperature range is about 60 to about 100° C. Polymerization pressures known for use in the polymerization of vinyl fluoride polymer can be used and will depend on the type of equipment and process used. Pressures of about 2 kPa (300 psi) to about 70 kPa (10,000 psi) can be used. Solids contents of the vinyl fluoride dispersions obtained can be about 5 to about 40 weight percent.

If desired, the process of the invention can be conducted in a batch process. The term "batch process" is meant to include both processes in which all materials including water, vinyl fluoride, comonomers (if used), initiator and surfactant are initially charged to the vessel, and processes carried out in a vessel such as a stirred autoclave in which materials necessary to begin the polymerization such as water, vinyl fluoride, comonomers (if used) and surfactant are initially charged but additional ingredients such as monomer, comonomer (if used) and initiator may be added to sustain the polymerization. When a batch process is used, vinyl fluoride polymer is preferably obtained in the form of an aqueous dispersion. Solids contents of the vinyl fluoride dispersions obtained can be about 10 to about 40 weight percent, preferably about 20 to about 35 weight percent. When employing a process of the invention in a batch process, the polymerization preferably produces less than about 3 weight percent coagulum (undispersed vinyl fluoride polymer) based on the total weight of fluoropolymer produced, more preferably less than about 1 weight percent coagulum. Particles of vinyl fluoride in the dispersion preferably have a particle size, $D_v(50)$ of about 100 to about 400 nm, more preferably 200-300 nm. Preferably, less than 1.0 volume percent of the vinyl fluoride polymer aggregates have a particle size of greater than about 20 microns based on the total volume of vinyl fluoride polymer produced.

A continuous process can also be used in which all necessary ingredients are continuously fed to a stirred vessel, and product is continuously removed in such a way that conditions in the vessel remain generally in a steady state with regard to temperature, pressure and ingredient concentrations. Vinyl fluoride polymer is typically obtained from continuous processes in the form of a slurry containing aggregates of primary particles of vinyl fluoride polymer. Aggregates of primary particles are formed due to the high shear conditions to which the polymer is subjected in the polymerization process. Solids contents of the vinyl fluoride polymer slurries obtained can be about 5 to about 20 weight percent, preferably about 7 to about 12 weight percent. When using a continuous process, it is preferred for the aggregates obtained to be in a size range which facilitates separation from the aqueous medium water by filtration, e.g., 6-11 μm, and to have a narrow particle size distribution. Preferably, less than 1.0 volume percent of the vinyl fluoride polymer aggregates have a particle size of greater than about 30 microns based on the total volume of vinyl fluoride polymer produced. More preferably, less than 0.8 volume percent of vinyl fluoride polymer aggregates have a particle size of greater than about 30 microns based on the total volume of vinyl fluoride polymer produced.

In a process of the invention, the halogen-free surfactant is added to the aqueous polymerization medium so that it is present in an amount less than about 0.1 weight percent based on the weight of the medium. The amount of surfactant present is determined in a batch process based on the weight of the aqueous polymerization medium when polymerization is commenced, i.e., is determined from the amount of halogen-free surfactant added to the aqueous medium prior to the start of polymerization. For a continuous process, the amount of surfactant is determined based on the amount of surfactant in the aqueous polymerization medium being introduced into the reactor. Preferably, the halogen-free surfactant is present in the medium in an amount less than about 0.07 weight percent based on the weight of the aqueous polymerization medium. More preferably, the halogen-free surfactant is present in the medium in an amount less than about 0.03 weight percent based on the weight of the aqueous polymerization medium. It is also preferable for the halogen-free surfactant to be present in an amount above the critical micelle concentration for the surfactant and thus, for this form of invention, the lower limit of surfactant amount based on CMC will vary with the CMC of the particular surfactant employed. It is preferred for the surfactant to be present in an amount of at least about 2 times the CMC, more preferably 3 times the CMC.

In a process of the invention, the aqueous polymerization medium is essentially free of halogen-containing surfactant. By "halogen-containing surfactant" is meant a surfactant which contains halogen covalently bonded to a carbon atom in the surfactant, e.g., fluorosurfactant. By "essentially free of halogen-containing surfactant" is meant that halogen-containing surfactant is present in an amount less than about 0.005 weight percent, more preferably less than about 0.001 weight percent based on the weight of the aqueous polymerization medium.

The invention can be employed advantageously in a batch process for vinyl fluoride polymerization to increase the solids content of the dispersion produced without significant adverse effect on vinyl fluoride molecular weight. In a continuous process, the broad particle size distribution of known processes can be controlled including a reduction of large agglomerates known to cause defects in vinyl fluoride polymer films.

The vinyl fluoride polymer produced in accordance with the process of the invention can be used similarly to vinyl fluoride polymer made by known processes and is especially useful for making coatings and films. Coatings and films of vinyl fluoride polymer can be made in film casting or coating processes using organic liquid dispersions (organosols) or solutions of the vinyl fluoride polymer in suitable organic liquid media. In addition, dispersions of vinyl fluoride polymer in organic solvents can be processed into films using solvent aided extrusion processes. For the preparation of such dispersions or solutions in organic liquids for coatings and film manufacture, the aqueous dispersions of vinyl fluoride polymer made in a batch process can be isolated from the aqueous dispersion by any of a variety of methods including strong agitation, increasing the ionic strength, freezing and thawing, and combinations thereof. Vinyl fluoride polymer made in the continuous process can be separated from the aqueous medium by filtering.

Organic liquids which are useful for making organic liquid dispersions and solutions are, for example, polar organic solvents such as N-methyl-2-pyrrolidone (NMP) and propylene carbonate, γ-butyrolactone, dimethylacetamide, dimethylsulfoxide, methylethyl ketone (MEK) and tetrahydrofuran (THF). Such dispersions or solutions are typically formed by dispersing or dissolving the vinyl fluoride polymer in dry resin form in the suitable organic liquid. For the production of dispersions, grinding or milling of the vinyl fluoride polymer, especially polymer made in a continuous process, is typically necessary to produce dispersions with the small and uniform particle size suitable for coating or film production. Because of the improved particle size distribution of vinyl fluoride polymer made in a continuous process in accordance with the invention, lower amounts of large particle aggregates are formed, and, consequently, grinding times to meet specifications can be greatly reduced.

The present invention is further illustrated by the Examples which follow, in which vinyl fluoride is polymerized by both batch and continuous processes.

Test Methods

Melt Temperature ($T_m$) is determined by differential scanning calorimetry (DSC) using a Q20 DSC (TA Instruments, New Castle, Del.). The melt temperature reported is the minimum of the endotherm in the DSC curve.

Figure 2:
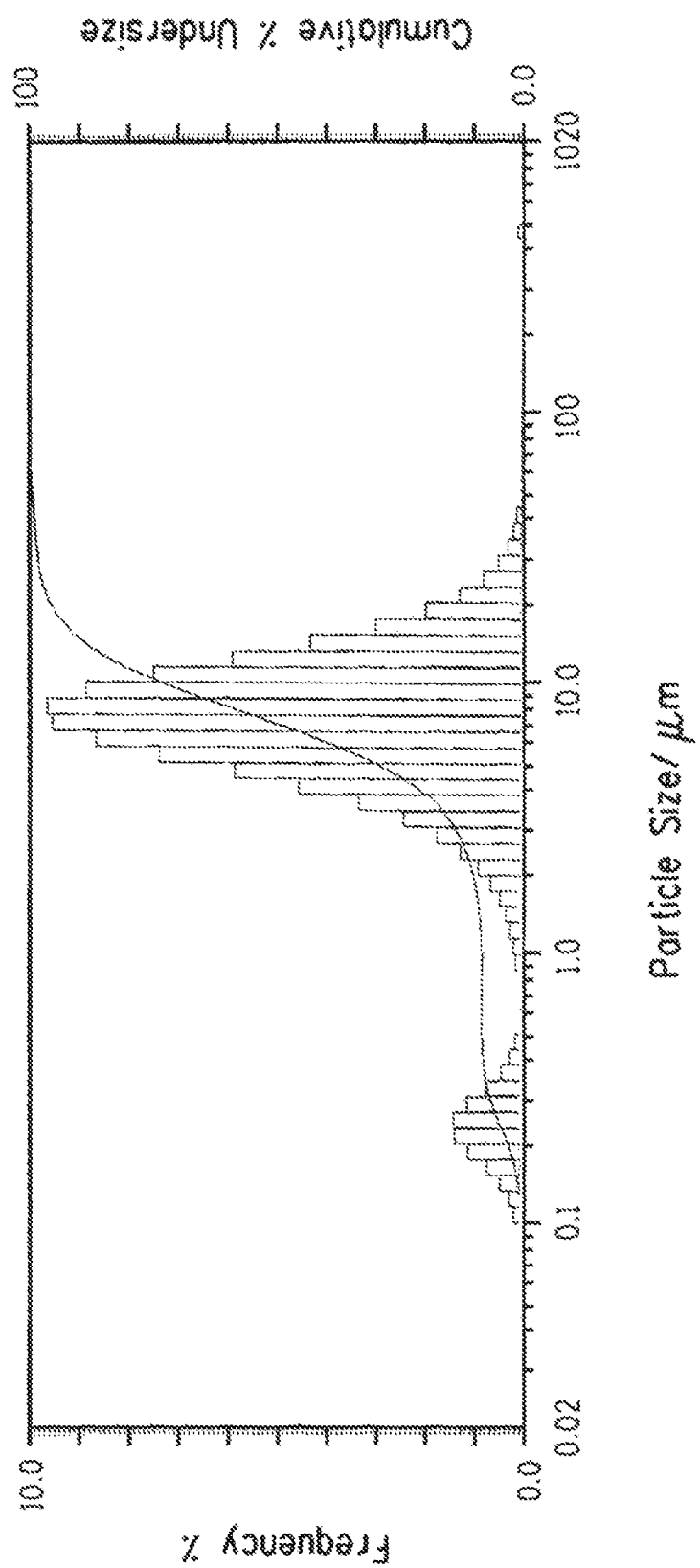
FIG. 2 is a graphical representation of the particle size distribution of particles of poly(vinyl fluoride) produced in a continuous process in accordance with the invention (Example 9).
Figure 3:
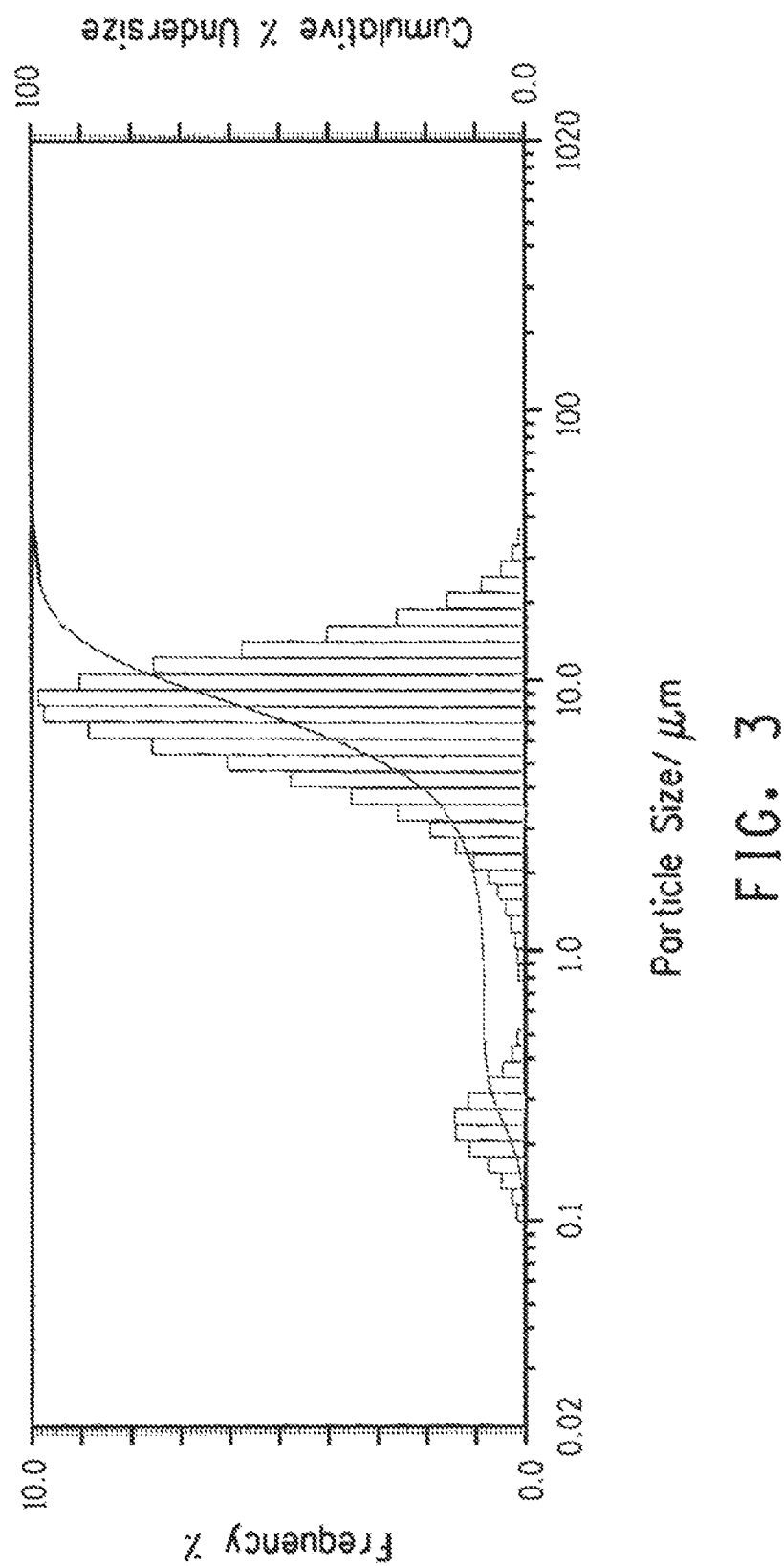
FIG. 3 is a graphical representation of the particle size distribution of particles of poly(vinyl fluoride) produced in a continuous process in accordance with the invention (Example 11).

Particle size is determined on dilute dispersions in water by light scattering using a Horiba LA-910 light scattering particle size analyzer (Horiba Instruments, Ann Arbor, Mich.). Samples provided in the sample chamber are diluted as necessary to obtain a signal which is indicated by the instrument as being in the desirable range. The particle size is reported as $D_v(50)$. $D_v(50)$ is the median particle size based on a volumetric particle size distribution, i.e., the particle size below which 50 volume % of the population resides. FIGS. 1, 2 and 3 present graphical representations of particle size distributions for three of the continuous polymerization examples. The graphs are a plot of particle size against frequency on a logarithmic scale and include a curve showing the cumulative volume % of particles in the distribution. The cumulative volume % of particles present for any range of particle sizes is the difference of the values on this curve at the ends of the range.

Critical micelle concentration (CMC) is measured in deionized water at 25° C. by measuring the surface tension for a series of solutions with a DuNouy tensiometer (ring method). A plot of surface tension vs. concentration on a logarithmic scale results in a line with two straight segments showing a distinct break defined as the CMC. To accurately locate the CMC, the straight line segments are fitted by least squares to yield an equation for each segment. To find the point of intersection, the equations are simultaneously solved to obtain the CMC and the surface tension at that point.

EXAMPLES

Surfactants

The halogen-free surfactants used in the Examples are listed in Table 1 below together with CMC and surface tension values at the CMC as measured by the Test Method above.

TABLE 1

CMC and Surface Tension of Surfactants

| | CMC (wt % in water) | Surface Tension (dyne/cm) at CMC |
|---|---|---|
| Tergitol ® 15-S-7 secondary alcohol ethoxylate | 0.0069 | 32.2 |
| Pluronic ® 31R1 PEO/PPO block copolymer | 0.00071 | 46.4 |
| Pluronic ® L92 PEO/PPO block copolymer | 0.00176 | 45.7 |
| Tetronic ® 710 PEO/PPO block copolymer | 0.000793 | 45.7 |
| Tetronic ® 150R1 PEO/PPO block copolymer | 0.000487 | 42.5 |

Examples 1-8 and Comparative Examples 1-2

These examples demonstrate the use of halogen-free surfactant in batch processes for the polymerization of vinyl fluoride monomer to produce poly(vinyl fluoride) in the presence of an initiator that produces cationic end groups in the polymer.

Polymerizations for Examples 1-8 and Comparative Examples 1-2 are carried out by a batch procedure in which 500 mL deionized water and an amount of nonionic surfactants as specified in Table 2 are charged to a 1 L stirred stainless steel autoclave. The CMC's for the surfactants used are reported in Table 1. The autoclave is alternately pressured and vented with nitrogen three times causing deaeration. The contents of the autoclave are brought to 80° C. Vinyl fluoride monomer, which is scrubbed free of polymerization inhibitor by passing the VF gas through a silica gel column, is charged to the vessel to attain a gauge pressure of 2.76 MPa (400 psig), and 0.10 g of initiator 2,2'-azobis(2-amidinopropane) dihydrochloride (V-50, Wako Chemical Co.) in water is added. As soon as a pressure drop is noted, additional VF is added at a rate to maintain constant pressure at 2.76 MPa, and 0.17 mL/min of 2.0% V-50 solution in water is added to the vessel during the polymerization. The monomer and initiator feeds are continued until the desired amount of monomer has been fed to achieve the target polymer solids in the reactor. Data specifying amounts of VF fed as a precharge to attain operating pressure and to attain desired polymer solids, along with the concentration of surfactant in the reactor liquid used, in each example are listed in Table 2. The rate for VF feed to maintain pressure, the feed time, and solids obtained during the polymerization are also reported in Table 2.

When polymerization is complete the contents of the reactor are cooled to about 30° C. and excess VF is vented. The product dispersion is discharged. Polymer is isolated by freeze coagulating the dispersion and filtering the solids from the aqueous phase. The filter cake is dried in a vented circulating air oven at 100° C. The dry polymer is used to determine melt temperature. Particle size is determined on the dispersion. Test methods and instrumentation are described above under Test Methods. Polymer data is reported in Table 2.

Referring to Table 2, the process of this invention produces dispersion particles having values for $D_v(50)$, and PVF resin having melt temperatures, within a narrow range indicating similar molecular structure. Further, from the data in Table 2, it is clear that the addition of the halogen-free surfactant used in the process of the invention permits a 25 to 90% increase in the weight % solids of PVF produced when comparing Examples 1-8 with Comparative Example 1 where no halogen-free surfactant is employed. Comparative Example 2 demonstrates the effect of attempting to increase the weight % solids of PVF by 25% without the addition of halogen-free surfactant. The process of Comparative Example 2 resulted in 95 wt % coagulum while the process of Comparative Example 1 resulted in 0 wt % coagulum, but at low polymer solids. By contrast, Examples 1-8 have both much higher polymer solids and result in 0 wt % coagulum.

Samples of the dispersions collected at each surfactant concentration are analyzed for particle size as described above under Test Methods. Particles size for each example is reported as a median volume distribution. Particle sizes above about 800 nm are thought to be aggregates of primary particles. FIGS. 1-3 show the particle size distributions obtained for the samples collected with 0 wt % (Comparative Example 3), 0.004 wt % (Example 9) and 0.02 wt % (Example 11) based on the amount of Pluronic® 31R1 added to the aqueous reactor feed. FIG. 1, corresponding to Comparative Example 3 which uses no surfactant, shows three peaks with the first peak centered at 0.29 microns accounting for 6% of the material in the sample. The second peak is centered at 9.5 microns and accounts for 91.5% of the material. The third peak is quite broad centered at about 260 microns, extending to 400 microns, and accounts for 2.5% of the material. The $D_v(50)$ for all particles is 16.6 microns and has a standard deviation of 36.4 microns. The latter number represents the breadth of the size distribution. These data are listed in Table 3. Comparing the particle size distribution of the material in Example 9

TABLE 2

Batch Polymerization of PVF

| Example | Surfactant | Precharge VF (g) | Surfactant amount (wt %) | VF Feed (g) | VF feed rate (g/min) | Total Monomer (g) | Polym Time (min) | Solids (%) | Polymer (g) | $T_m$ (° C.) | $D_v$ (50) (nm) | Coagulum (wt %) |
|---|---|---|---|---|---|---|---|---|---|---|---|---|
| Comp 1 | Pluronic ®31R1 | 33.14 | 0.000 | 87.39 | 1.590 | 120.53 | 70 | 15.1 | 92.1 | 181, 182 | 207 | 0 |
| Comp 2 | Pluronic ®31R1 | 33.17 | 0 | 116.97 | 1.626 | 150.1 | 90 | 18.9 | 120.4 | 184, 185 | 240 | 95 |
| 1 | Pluronic ®31R1 | 33.02 | 0.040 | 116.87 | 1.419 | 149.89 | 103 | 18.9 | 122.2 | 181, 184 | 161 | 0 |
| 2 | Pluronic ®31R1 | 33.35 | 0.020 | 162.56 | 1.635 | 195.91 | 120 | 24.4 | 170.6 | 181, 181 | 209 | 0 |
| 3 | Pluronic ®31R1 | 33.53 | 0.030 | 162.59 | 1.622 | 196.12 | 122 | 24.2 | 168.0 | 181, 183 | 211 | 0 |
| 4 | Pluronic ®31R1 | 33.17 | 0.040 | 213.38 | 1.612 | 246.55 | 157 | 28.9 | 213.9 | 180, 182 | 215 | 0 |
| 5 | Pluronic ®L92 | 33.59 | 0.010 | 167.68 | 1.296 | 201.3 | 152 | 26.71 | 186.8 | 177, 180 | 221 | 0 |
| 6 | Tergitol ®15-S-1 | 37.68 | 0.020 | 167.69 | 1.281 | 205.4 | 212 | 24.97 | 179.6 | 176, 180 | 127 | 0 |
| 7 | Tetronic ®701 | 33.54 | 0.010 | 167.65 | 1.071 | 201.2 | 155 | 28.26 | 197.9 | 179, 180 | 260 | 0 |
| 8 | Tetronic ®150R1 | 33.36 | 0.010 | 121.93 | 1.188 | 155.3 | 120 | 19.73 | 128.6 | 178, 180 | 227 | 0 |

Examples 9-11 and Comparative Example 3

These examples demonstrate the polymerization of vinyl fluoride monomer to produce PVF in the presence of an initiator that produces cationic end groups in the polymer and halogen-free surfactant in continuous processes.

The nonionic hydrocarbon surfactant Pluronic® 31R1 is used in the continuous emulsion polymerization of VF in a 200 gallon stirred autoclave. The CMC of Pluronic® 31R1 is reported in Table 1. Conditions for the polymerization are presented in Table 3. Deionized water and initiator 2,2'-azobis (N,N'-dimethyleneisobutyroamidine)dihydrochloride (VA-044, Wako Chemical Co.) are fed to the reactor at the rates specified. Pressure is controlled by operating a let down valve at the exit of the reactor. Temperature is set in the reactor by preheating the water feed. VF, that has been distilled free of polymerization inhibitor, is mixed with the water before it is fed into the reactor. As polymerization begins, the inlet temperature of the water is slowly lowered to compensate for the heat of polymerization. By balancing the water inlet temperature and the VF feed, the desired reactor temperature is maintained. VF feed is increased until the desired solids are obtained, which is judged by the difference between the inlet and reactor temperatures. Product dispersion is collected to provide material made in the absence of surfactant for comparison to PVF made in the presence of surfactant. Surfactant is added to the water inlet feed at rates to give the concentrations specified for Examples 9-11 in Table 3. No surfactant is added in Comparative Example 3.

made with 0.004 wt % Pluronic® 31R1 with the that of Comparative Example 3, all but a very small fraction of the large particles are gone. The position of the peaks representing particles of smaller size have shifted slightly to smaller particle sizes and the peaks have increased in relative height. The $D_v(50)$ for all particles has decreased from 16.6 microns to 8.45 microns and the standard deviation has decreased from 36.4 microns to 16.6 microns. Graphical data for Example 9 is shown in FIG. 2. Results for Example 11 made with 0.020 wt % Pluronic® 31R1 show a complete absence of particles greater than 40 microns. The results are shown graphically in FIG. 3. The particle distribution data reported in Table 3 have shifted further to smaller particle sizes. The $D_v(50)$ has decreased to 7.43 microns with a standard deviation of only 4.65 microns. This represents a significant quality improvement for PVF used to prepare organosols that are cast into protective and decorative films for a variety of applications. The smaller particle size, particularly the absence of particles larger than 100 microns, reduces milling time for organosol preparation and reduces gels that lead to film defects during the casting process.

The polymers from each of these examples is isolated by filtration in a filter press and dried in a vacuum oven at 80° C. with a nitrogen sweep. Melting points for the polymers made in Examples 9-11 and Comparative Example 3 are determined as described in the Test Methods and are within experimental error of each other, indicating that the surfactant does not exhibit effects on molecular structure under the conditions used for polymer preparation.

TABLE 3

Continuous Polymerization of PVF
Continuous Polymerization Conditions

| | Example | | | |
|---|---|---|---|---|
| | Comp 3 | 9 | 10 | 11 |
| Deionized water fed (lb/hr) | 14800 | 14800 | 14800 | 14800 |
| VF Fed (lb/hr) | 1400 | 1400 | 1400 | 1400 |
| VA-044 solution 1.4% (lb/hr) | 50 | 50 | 50 | 50 |
| Reactor pressure (psig) | 7500 | 7500 | 7500 | 7500 |
| Reactor temperature (° C.) | 93 | 93 | 93 | 93 |
| Reactor dispersion solids (wt %) | 6.5 | 6.5 | 6.5 | 6.5 |
| PVF produced (lb/hr) | 960 | 960 | 960 | 960 |
| Pluronic ® 31R1 wt % | 0 | 0.004 | 0.012 | 0.020 |
| Reactor Dispersion Particle Size Distribution | | | | |
| peak dia (μ)/vol % | 0.296/6.0 | 0.243/7.8 | 0.243/7.9 | 0.23/8.0 |
| peak dia (μ)/vol % | 9.5/91.5 | 8.2/92.1 | 8.8/92.0 | 8.2/92.0 |
| peak dia (μ)/vol % | 260/2.5 | 517/0.1 | 517/0.1 | |
| $D_v$ (50) (μ) | 16.6 | 8.45 | 8.47 | 7.43 |
| st dev | 36.4 | 16.6 | 16.5 | 4.65 |
| Dry PVF Properties | | | | |
| $T_m$ (° C.) | 195, 193 | 193, 191 | 194, 192 | 193, 192 |

Examples 12-14 and Comparative Example 4

These examples demonstrate the polymerization of vinyl fluoride monomer to produce PVF at different reactor wt % solids in the presence of an initiator that produces cationic end groups in the polymer and halogen-free surfactant in continuous processes.

The nonionic hydrocarbon surfactant Pluronic® 31R1 is used in the continuous emulsion polymerization of VF in a 200 gallon stirred autoclave. The CMC of Pluronic® 31R1 is reported in Table 1. Conditions for the polymerization are presented in Table 4. Deionized water and initiator 2,2'-azobis(N,N'-dimethyleneisobutyroamidine)dihydrochloride (VA-044, Wako Chemical Co.) are fed to the reactor at the rates specified. Concentration of the initiator solution fed to the reactor is adjusted for convenience in order to obtain the desired reactor wt % solids. Pressure is controlled by operating a let down valve at the exit of the reactor. Temperature is set in the reactor by preheating the water feed. VF, that has been distilled free of polymerization inhibitor, is mixed with the water before it is fed into the reactor. As polymerization begins, the inlet temperature of the water is slowly lowered to compensate for the heat of polymerization. By balancing the water inlet temperature and the VF feed, the desired reactor temperature is maintained. VF feed is increased until the desired wt % solids are obtained, which is judged by the difference between the inlet and reactor temperatures. Product dispersion is collected to provide material made in the absence of surfactant for comparison to PVF made in the presence of surfactant. Surfactant is added to the water inlet feed at rates to give the concentrations specified for Examples 12-14 in Table 4. No surfactant is added in Comparative Example 4.

Samples of the dispersions collected at each wt % solids condition in the reactor are analyzed for particle size as described above under Test Methods. Particles size for each example is reported as a median volume distribution for each wt % solids condition. Particle sizes above about 800 nm are thought to be aggregates of primary particles. The amount of Pluronic® 31R1 in each case was 0.02 wt % except for the baseline case which had no Pluronic® 31R1. Except for the baseline case, polymer made from 6.5 wt % solids to 8.0 wt % solids had no particles greater than 20 microns. The baseline case, without surfactant, had particles up to about 300 microns in diameter. Mean diameters and volume averages for particles are given in Table 4. This represents a significant quality improvement for PVF used to prepare organosols that are cast into protective and decorative films for a variety of applications. The smaller particle sizes, and particularly the absence of particles larger than 40 microns, reduces milling time for organosol preparation and reduces gels that lead to film defects during the casting process.

The polymers from each of these examples is isolated by filtration in a filter press and dried in a toroidal dryer manufactured by Fluid Energy Corp. (Telford, Pa.), at 80 to 125° C. with an air sweep. Melting points for the polymers made in Examples 12-14 and Comparative Example 4 are determined as described in the Test Methods and are within experimental error of each other, indicating that the surfactant does not exhibit effects on molecular structure under the conditions used for polymer preparation. Films are cast from organosol dispersions prepared by milling a mixture of 40% PVF in propylene carbonate with glass beads on a paint shaker for 15 minutes. Tensile properties obtained in this way are also within the precision limits of the standard deviation calculated for the replicate samples. Mechanical properties are measured using a Multi Station Load Frame Q Test/500LP (MTS Systems Corp., Eden Prairie, Minn.) on 1 mil thick films in accordance with ASTM D638 and represent the average of five measurements for each film. Film mechanical properties are insensitive to the presence of surfactant except for the strain at break. The similarity for the values measured for the other mechanical properties suggests that the surfactant does not compromise molecular weight. One possible explanation for the for the shorter strain at break for the film sample made with polymer in the absence of surfactant may be that the presence of large agglomerates in the film concentrate stress in the area near the agglomerate, causing the film to break at shorter strains than films that do not have large agglomerates.

TABLE 4

Continuous Polymerization of PVF
Continuous Polymerization Conditions

|  | Example | | | |
| --- | --- | --- | --- | --- |
|  | Comp 4 | 12 | 13 | 14 |
| Deionized water fed (lb/hr) | 13000 | 13000 | 13000 | 12500 |
| VF Fed (lb/hr) | 1520 | 1515 | 1530 | 1525 |
| VA-044 solution 1.4% (lb/hr) | 52 | 57 | | |
| VA-044 solution 2.4% (lb/hr) | | | 46 | 66 |
| Reactor pressure (psig) | 7500 | 7500 | 7500 | 7500 |
| Reactor temperature (° C.) | 93 | 93 | 93 | 93 |
| Reactor dispersion solids (wt %) | 6.5 | 6.5 | 7.4 | 8.0 |
| PVF produced (lb/hr) | 1034 | 1040 | 1200 | 1250 |
| Pluronic ® 31R1 (wt %) | 0 | 0.02 | 0.02 | 0.02 |
| Reactor Dispersion Particle Size Dispersion | | | | |
| peak dia (μ)/vol % | — | 0.42/5.7 | 0.39/5.4 | 0.39/4.1 |
| peak dia (μ)/vol % | 10.2/89.6 | 6.7/94.3 | 6.7/94.6 | 6.7/95.9 |
| peak dia (μ)/vol % | 101/10.4 | — | — | — |
| Dry PVF Properties | | | | |
| Tm (° C.) | 193, 192 | 193, 192 | 192, 191 | 191, 190 |
| ΔHf (J/g) | 65, 59 | 61, 54 | 64, 57 | 65, 59 |
| Tg (° C.) | 43, 46 | 47, 46 | 44, 46 | 44, 46 |
| Film Mechanical Properties | | | | |
| Young's modulus (kpsi) | 164 | 177 | 175 | 190 |
| yield point (%) | 5.63 | 5.72 | 5.34 | 5.46 |
| yield stress (kpsi) | 4.87 | 5.32 | 5.23 | 5.73 |
| max stress (kpsi) | 4.87 | 5.32 | 5.23 | 5.73 |
| strain @ max (%) | 5.63 | 5.81 | 5.34 | 5.46 |
| stress at break (kpsi) | 3.93 | 4.08 | 3.55 | 3.95 |
| strain @ break (%) | 40.9 | 72.5 | 103 | 95.9 |

What is claimed is:

1. A process for producing vinyl fluoride polymer comprising polymerizing vinyl fluoride in an aqueous polymerization medium containing initiator and halogen-free surfactant with a critical micelle concentration of less than 0.05 weight percent at 25° C., said halogen-free surfactant being present in said aqueous polymerization medium in an amount less than 0.1 weight percent based on the weight of the aqueous polymerization medium, said aqueous polymerization medium being essentially free of halogen-containing surfactant, wherein said vinyl fluoride polymer produced comprises at least 90 weight percent vinyl fluoride units.

2. The process of claim 1 wherein said halogen-free surfactant is present in said aqueous polymerization medium in an amount above the critical micelle concentration for the halogen-free surfactant.

3. The process of claim 1 wherein said halogen-free surfactant is present in said aqueous polymerization medium in an amount less than 0.07 weight percent.

4. The process of claim 1 wherein said halogen-free surfactant is present in said aqueous polymerization medium in an amount less than 0.03 weight percent.

5. The process of claim 1 wherein said halogen-free surfactant has a critical micelle concentration of less than 0.01 weight percent at 25° C.

6. The process of claim 5 wherein said halogen-free surfactant is present in said aqueous polymerization medium in an amount above the critical micelle concentration for the halogen-free surfactant.

7. The process of claim 1 wherein said initiator produces cationic end groups in the polymer.

8. The process of claim 1 wherein said initiator is water soluble organic azo initiator.

9. The process of claim 1 wherein said halogen-free surfactant is nonionic.

10. The process of claim 1 wherein said halogen-free surfactant is hydrocarbon surfactant.

11. The process of claim 1 wherein said halogen-free surfactant comprises polymeric blocks of alkylene oxide units.

12. The process of claim 11 wherein said halogen-free surfactant comprises polymeric blocks of ethylene oxide and polymeric blocks of propylene oxide.

13. The process of claim 1 wherein said halogen-free surfactant is free of aromatic groups.

14. The process of claim 1 wherein said vinyl fluoride polymer produced is polyvinyl fluoride homopolymer.

15. The process of claim 1 wherein said process is a batch process and produces an aqueous dispersion of vinyl fluoride polymer particles.

16. The process of claim 15 wherein said polymerizing vinyl fluoride produces less than 3 weight percent coagulum based on the total weight of vinyl fluoride polymer produced.

17. The process of claim 1 wherein said process is a continuous process and said vinyl fluoride polymer produced comprises aggregates of primary vinyl fluoride polymer particles.

18. The process of claim 17 wherein less than 1.0 volume percent of said vinyl fluoride polymer aggregates have a particle size of greater than 30 microns based on the total volume of vinyl fluoride polymer produced.

* * * * *